United States Patent [19]

Kirk

[11] 3,914,754

[45] Oct. 21, 1975

[54] MACHINE ELEMENT POSITION DETECTION SYSTEM

[75] Inventor: Colin John Kirk, Crowthorne, England

[73] Assignee: Martonair Limited, England

[22] Filed: June 24, 1974

[21] Appl. No.: 482,253

Related U.S. Application Data

[63] Continuation of Ser. No. 253,607, May 15, 1972, abandoned.

[30] Foreign Application Priority Data

May 18, 1971 United Kingdom............... 15454/71

[52] U.S. Cl.................. 340/267 R; 73/37; 73/552; 181/123; 340/1 R; 235/201 FS
[51] Int. Cl.² . G08B 21/00; G01S 9/66; G01M 3/02
[58] Field of Search............ 340/267 R, 259, 258 B, 340/1 R; 181/0.5, 123; 73/552, 37.5, 37; 235/201 FS

[56] References Cited

UNITED STATES PATENTS

| | | | |
|---|---|---|---|
| 2,235,928 | 3/1941 | Hardinge | 241/34 |
| 2,862,200 | 11/1958 | Shepherd et al. | 340/189 |
| 3,499,312 | 3/1970 | Eickenhorst | 73/37.5 |
| 3,500,952 | 3/1970 | Beeken | 181/123 |
| 3,608,355 | 9/1971 | Harrison | 73/37 |
| 3,694,800 | 9/1972 | Frank | 340/1 R |
| 3,729,702 | 4/1973 | Beeken et al. | 181/123 |
| 3,774,192 | 11/1973 | Boulter | 340/259 |
| 3,777,074 | 12/1973 | Olmsted | 340/267 R |

*Primary Examiner*—Maynard R. Wilbur
*Assistant Examiner*—G. E. Montone
*Attorney, Agent, or Firm*—Edward F. Connors

[57] ABSTRACT

A positional detection system employs a transmitter of a stream of coded fluid pressure wave pulses connected by a waveguide to a plurality of outlets arranged adjacent various operative machine elements whereby movement of any of these elements varies the effective output of fluid pressure wave signals from an associated outlet. A common receiver is employed to respond to the fluid pressure wave pulses emanating from any of the outlets associated to identify the particular outlet and thus the machine element with which the pulses are associated by means of the coding employed. The fluid pressure waves are essentially non-directional and both transmitter and receiver may incorporate fluidic devices.

8 Claims, 5 Drawing Figures

MACHINE ELEMENT POSITION DETECTION SYSTEM

This is a continuation of application Ser. No. 253,607 filed May 15, 1972, now abandoned.

This invention relates to a positional detection system employing fluid pressure waves, and is particularly, but not exclusively, concerned with a positional detection system for providing position information concerning operative parts of a machine tool to, say, a control unit, which may be remote from the machine tool, whereby a check may be kept on the current position of various operative parts of the machine tool and appropriate control instructions may be subsequently fed to the machine from the control unit.

Hitherto it has been proposed to employ ultrasonic generators involving electrical transducers, to produce signals of ultrasonic frequency which, when interrupted by a physical object, produce a control signal for control purposes. Such proposals employ a directional 'beam' of ultrasonic frequency passing direction from a transmitter transducer element to a receiver transducer element. A disadvantage of such proposals is that a separate mutally aligned transmitter and receiver have been employed for each signal 'beam'. It is an object of the present invention to mitigate this disadvantage.

The invention provides a method of detecting the position of a movable element of a machine whereby to enable the position of the element to be controlled, which method comprises transmitting a stream of fluid pressure wave pulses of predetermined duration and at predetermined intervals in a code which identifies said machine element through waveguide means to an outlet, which is occluded in one position of the element and is unobstructed in another position of the element, in which other position said coded pulses emanate from said outlet as a coded non-directional pressure wave signal which permeates the atmosphere and detecting the emanation of said coded signal with a receiver arranged in a position independent of the position of said outlet to produce an output signal which varies according to the position of said machine element.

The fluid employed is preferably pneumatic whereby transmission through the atmosphere between transmitter and receiver may be effected, and the frequency of the pressure waves may be sonic, that is below the ultrasonic frequency range.

The invention also provides the method of detecting the position of a plurality of separate movable elements of a machine, whereby to enable the position of each element to be controlled, the method including producing separate streams of coded pulses, each stream being associated with and coded to identify a particular one of a plurality of different machine elements, separately transmitting said pulse streams through respective waveguide means to a corresponding plurality of outlets, each of which is associated with a particular machine element and is arranged to be occluded by that machine element at a position over its range of movement, but is otherwise unobstructed, whereby to produce, in the unobstructed condition of said outlets, simultaneous coded non-directional pressure wave signals which identify and indicate the position of individual machine elements, and receiving said simultaneous coded signals in a common receiver and discriminating between them by means of the coding employed.

The invention further provides positional detection apparatus for performing either of the above methods when installed in a machine or machines with movable elements whose position is to be detected.

In practice, said transmitter and/or said receiver may include some form of fluidic device, in the case of the transmitter, for example, a fluidic oscillator.

In a position control system employing positional detection apparatus of the kind referred to, control means are provided responsive to an output of said receiver whereby to initiate predetermined control action upon reception of a predetermined fluid pressure wave signal emanating from an outlet.

The use of non-directional pressure wave signals in the present invention together with waveguide means enables a single transmitter to be utilised for producing signals from a number of outlets and thus the transmitter may be located at any convenient position in or adjacent the machine. In addition, a common receiver, not necessarily aligned with any particular outlet, may be employed to detect the signals from all of the outlets. This receiver may employ some form of transducer to control the pressure wave signals into, say, electrical signals.

There now follows a description of a control system incorporating a pneumatic positional detection according to the invention, by way of example only, with reference to the accompanying drawings, in which.

Figure 1A:
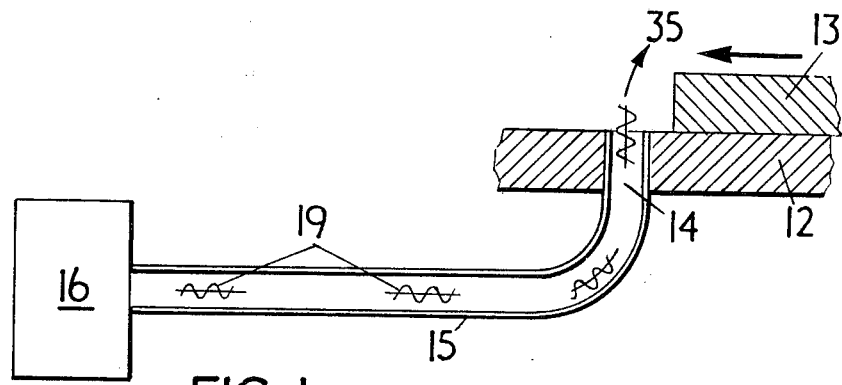
FIGS. 1a, 1b and 1c show diagramamatically three alternative transmitter arrangements.

Referring to the drawings, a transmitter 16 of non-directional fluid pressure wave pulses, coded in a manner described later, is arranged to deliver its output of fluid pressure wave pulses 19 along a waveguide comprising a pipe or tube 15 to an outlet 14 arranged at a point in the machine which is adjacent a movable machine element 13 whose position is to be detected and subsequently controlled. The movable machine element 13 slides over one surface of a stationary machine element 12 and at one part of its movement occludes the outlet 14 through which fluid pressure wave pulses 19 would otherwise emanate into the surrounding atmosphere as a coded non-directional fluid pressure wave signal 35. The arrangement illustrated is essentially for the 'on-off' transmission of coded fluid pressure wave pulses and may be used to transmit information about two possible positions of the machine element 13 to be controlled and corresponding respectively to when the outlet 14 is obstructed and no fluid pressure wave pulses are transmitted and when the outlet 14 is no longer obstructed and fluid pressure wave pulses are transmitted. Information about additional positions of the machine element may be transmitted by using additional, appropriately placed, outlets arranged to receive individual streams of fluid pressure wave pulses. It is also possible to transmit information concerning the number of times the machine element 13 has moved from a position at which it obstructs the outlet 14 to a position at which the outlet 14 is open.

Figure 3:
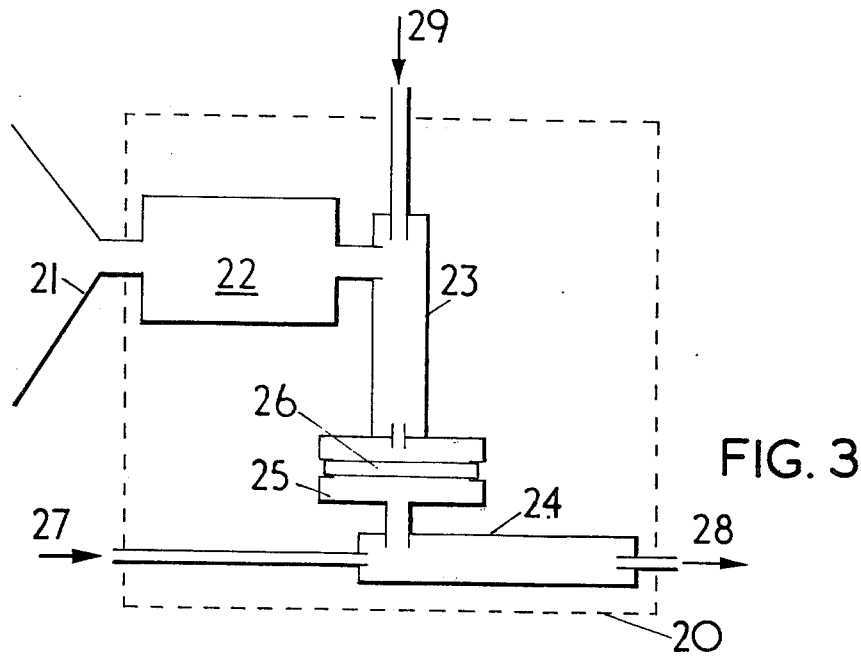
FIG. 3 shows diagrammatically a receiver stage for receiving and responding to fluid pressure waves transmitted by the transmitter of FIG. 2.

Referring to FIG. 3, the receiver, indicated generally by the dashed boundary line 20, employs a horn 21 to receive the signal 35 and communicating with a chamber 22 acting as a form of Helmholtz resonator with a filtering or tuning action for pressure waves of a selected frequency. Also connected to the chamber 22 is a turbulence amplifier 23 operating in the manner of the known fluid device, and connected to a chamber 25 housing a diaphragm 26. The turbulence amplifier 23 is arranged to control the flow of a pressure wave input signal 29 from an unshown source to the volume defined within the chamber 25 above the diaphragm 26. The latter, together with the turbulence amplifier 23 constitute a frequency selective decoder stage which is arranged to pass a selected frequency of pressure waves to a modulator stage comprising another turbulence amplifer 24 arranged to produce a control signal 28 by controlling the flow of an input signal 27 derived from an unshown source of pressure waves. The control signal 28 is fed to an appropriate actuator to effect the necessary control action, for example, movement of the machine element whose position is being sensed. The frequency selection performed by the chamber 22 may be supplemented by the turbulence amplifier 23 which, in some instances, is frequency selective. Indeed the separate filter stage constituted by the chamber 22 may be dispensed with altogether.

The diaphragm 26 is arranged to resonate at the desired frequency for the control signal output 28 of the decoder stage. An alternative arrangement may, however, be used in place of the diaphragm 26.

Figure 1B:
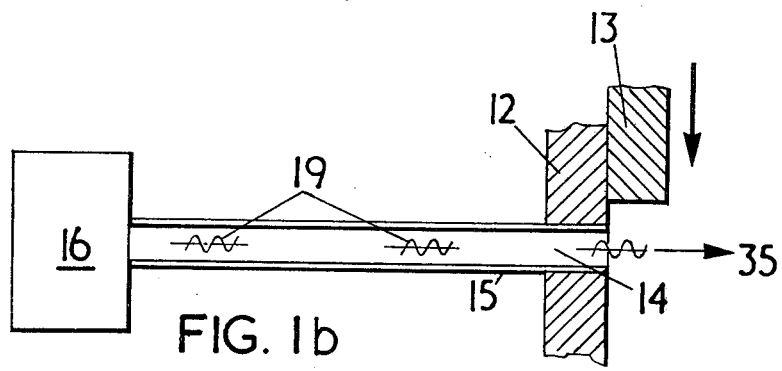

FIG. 1b shows a similar arrangement to that illustrated in FIG. 1a except that the pipe 15 is straight resulting in a direct path between the generator transducer 16 and the outlet 14. The arrangement of FIG. 1a, in which the pipe 15 is curved, simply illustrates the fact that the transmitter 16 need not be directly in line with the outlet 14 but may be arranged at any convenient point on the machine, the fluid pressure waves then being guided to the outlet 14 by an appropriately shaped pipe 15.

Figure 1C:
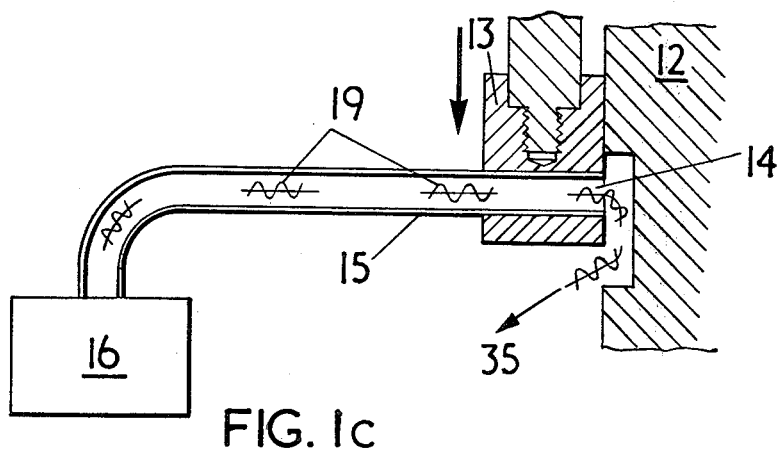

FIG. 1c shows a modification of the arrangement shown in FIGS. 1a and 1b, in which the pipe 15 is mounted at one end in the movable machine element 13 and directs fluid pressure wave pulses towards a stationary machine element 12 provided with a shallow recess along which the fluid pressure wave pulses may be deflected for subsequent emanation into free space. At one position of the machine element 13 the shallow recess 17 in the stationary machine element 12 is completely obstructed and no fluid pressure waves passing along the pipe 15 through the outlet 14 can pass into free space.

Figure 2:
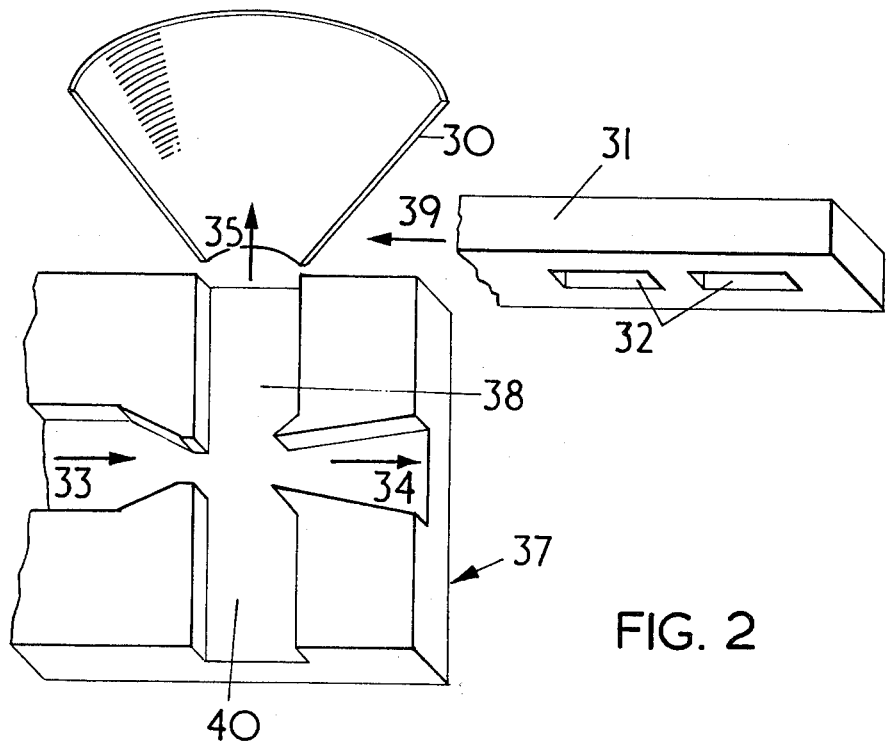
FIG. 2 shows diagrammatically, in greater detail than FIGS. 1a, ib and 1c a transmitter stage.

The transmitter 16 is shown in more detail in FIG. 2 and takes the form of a fluidic device employing a specially-formed configuration of channels in a block 37, which is normally covered by an unshown cover plate. The transmitter stage includes a pneumatic oscillator which operates on the edgetone principle and utilises a double edge to produce a 'push-pull' effect. The channel 33 is connected to an unshown source of pressure waves and the channel 34 serves as a vent. Turbulence produced at the intersection of the four channels 33, 34, 38 and 40 results in pressure wave oscillations building up. The emitted frequency is dependent upon the length of an unshown resonator column connected, say, to the channels 38 and 40. Output of pressure waves of selected frequency occurs from both channels 38 and 40 but one channel, for example, channel 40, may be blocked to concentrate the entire output 35 into the one remaining channel 38 which communicates with a horn 30. The output signal is controlled by means of a perforated plate 31 in which apertures 32 are so shaped and spaced that, as the plate 31 is moved across the output channel 38, the output 35 is varied from full to zero output. Consequently a pulse train of pressure waves may be produced by repeated movement of the plate 31. The plate 31 is attached to the movable machine element 13 whose position is to be controlled.

In the various examples described, the transmitter 16 is arranged to produce a stream of fluid pressure wave pulses of predetermined duration and at predetermined time intervals which identify a particular movable machine element. The code may also identify the particular outlet from which the pulses emanate, thus providing additional position information about the associated machine element. In this way spurious fluid pressure waves, for example in the form of various machine noises, will not degrade the transmitted signal and will not affect the control action initiated. This coding also enables a common receiver to be employed for receiving fluid pressure wave information above several different machine elements on one or more individual machines. Each machine and/or machine element is accorded a distinct code so that the control unit can recognise from which element and machine the fluid pressure waves transmitted and received by the receiver have originated. Different frequencies of fluid pressure waves may also be employed so that the control unit can separate out fluid pressure waves simultaneously present at the receiver but originating from different sources.

The pressure waves employed may be of ultrasonic or sonic frequency and a typical frequency range would be from 10Hz to say, 20 KHz for the latter frequency range and above this range for the form frequency range.

What I claim as my invention and desire to secure by Letters Patent of the United States is:

1. A method of detecting the position of an operative element of a machine whereby to enable the position of the element to be controlled, which method comprises transmitting a stream of fluid pressure wave pulses of predetermined duration and at predetermined intervals in a code which identifies said machine element through waveguide means to an outlet which is occluded in one position of the element and is unobstructed in another position of the element, in which other position said coded pulses emanate from said outlet as a coded non-directional pressure wave signal which permeates the atmosphere and detecting the emanation of said coded signal with a receiver arranged in a position independent of the position of said outlet to produce for control purposes an output signal which varies according to the position of said machine element.

2. The method, as claimed in claim 1, wherein said fluid is pneumatic whereby transmission directly into the atmosphere between transmitter and receiver may be effected.

3. The method, as claimed in claim 1, wherein the frequency of the pressure waves is sonic, that is below the ultrasonic frequency range.

4. Positional detection apparatus for performing the method as claimed in claim 1, comprising a transmitter of a stream of fluid pressure wave pulses of predetermined duration and at predetermined intervals in a code which identifies said machine element whose position is to be detected, an outlet for said fluid pressure wave pulses, waveguide means connecting said transmitter to said outlet which is so arranged that said machine element will occlude that outlet at a position over its possible range of movement and will otherwise leave said outlet unobstructed to allow the emanation of a non-directional coded pressure wave signal therefrom, and a receiver arranged at a position independent of the position of said outlet to detect the coded signal emanating from said outlet and to produce an output representing the position of the machine element for subsequent control thereof.

5. Positional detection apparatus, as claimed in claim 4, wherein said receiver includes a fluidic device.

6. Positional detecting apparatus, as claimed in claim 4, wherein said transmitter includes a fluidic device.

7. Positional detection apparatus, as claimed in claim 4, for detecting the position of a plurality of different machine elements, and including a corresponding plurality of outlets each associated with a particular one of said machine elements and connected by said waveguide means to said transmitter which includes means for producing separate streams of coded pulses for identifying particular machine elements, said pulse streams being separately transmitted to the appropriate outlet for control by the associated machine element, to produce, in the unobstructed conditions of said outlets simultaneous non-directional coded pressure wave signals which are received by a common receiver which identifies the position of particular machine elements by means of the coding employed.

8. A method of detecting the position of a plurality of separate movable elements of a machine whereby to enable the position of each element to be controlled, which method comprises producing separate streams of coded pulses, each stream being associated with and coded to identify a particular one of a plurality of different machine elements, separately transmitting said pulse streams through respective waveguide means to a corresponding plurality of outlets, each of which is associated with a particular machine element and is arranged to be occluded by that machine element at a position over its range of movement, but is otherwise unobstructed, whereby to produce, in the unobstructed condition of said outlets, simultaneous coded non-directional pressure wave signals which identify and indicate the position of individual machine elements, and receiving said simultaneous coded signals in a common receiver and identifying the position of particular machine elements by means of the coding employed.

* * * * *